United States Patent
Krieger

(10) Patent No.: US 7,253,733 B2
(45) Date of Patent: Aug. 7, 2007

(54) CABLE LOCK SYSTEM

(75) Inventor: Michael Krieger, Miami Beach, FL (US)

(73) Assignee: Vector Products, Inc., Ft. Lauderdale, FL (US)

( * ) Notice: Subject to any disclaimer, the term of this patent is extended or adjusted under 35 U.S.C. 154(b) by 0 days.

(21) Appl. No.: 11/098,466

(22) Filed: Apr. 5, 2005

(65) Prior Publication Data

US 2005/0237192 A1 Oct. 27, 2005

Related U.S. Application Data

(63) Continuation of application No. 10/737,927, filed on Dec. 18, 2003.

(60) Provisional application No. 60/433,962, filed on Dec. 18, 2002.

(51) Int. Cl.
*G08B 13/12* (2006.01)
*G08B 13/14* (2006.01)

(52) U.S. Cl. .............. 340/568.2; 340/542; 340/568.1; 340/572.9

(58) Field of Classification Search ............ 340/542, 340/568.1–568.4, 571, 572.8, 572.9, 584, 340/600, 432
See application file for complete search history.

(56) References Cited

U.S. PATENT DOCUMENTS

| | | | |
|---|---|---|---|
| 4,776,188 A | | 10/1988 | Dalabs et al. |
| 4,920,334 A | * | 4/1990 | DeVolpi ................. 340/568.4 |
| 4,985,695 A | * | 1/1991 | Wilkinson et al. ....... 340/568.3 |
| 5,408,212 A | | 4/1995 | Meyers et al. |
| 5,815,069 A | | 9/1998 | Horton |
| 5,889,463 A | * | 3/1999 | Judd et al. ................. 340/427 |
| 6,690,267 B2 | * | 2/2004 | Linden et al. ............. 340/432 |

* cited by examiner

*Primary Examiner*—Jeffery Hofsass
*Assistant Examiner*—Samuel J Walk
(74) *Attorney, Agent, or Firm*—Venable, LLP; Robert Kinberg; Jeffri A. Kaminski

(57) ABSTRACT

A cable alarm system is provided that includes: a lock; a cable coupled to the lock and operative to conduct a current; a secondary wire coupled to the lock and parallel to the cable and operative to conduct a current; a current detector coupled to the cable and the secondary wire, operative to detect an interruption of a current in at least one of the cable and the secondary wire; a battery operative to supply power to the current detector; an alarm coupled to the current detector and receiving power from the battery; and a heat sensor coupled to the cable and the secondary wire.

13 Claims, 2 Drawing Sheets

CABLE LOCK SYSTEM

CROSS-REFERENCES TO RELATED APPLICATION

This application is a CON of Ser. No. 10/737,927 Dec. 18, 2003 which claims benefit of Ser. No. 60/433,962 Dec. 18, 2002.

BACKGROUND OF THE INVENTION

1. Field of the Invention

The present invention relates to an alarmed cable locking system.

2. Related Art

A typical cable locking system consists of a strong cable and a physical lock, which secures the ends of the cable together, forming a strong loop which can be used to secure an object to another object to prevent theft. The conventional locking systems, however, can be defeated with the proper tools, such as with a torch, which can burn through the cable, or with very strong bolt cutters.

Some cable lock systems provide an alarm that sounds when the cable is cut or when the lock unit is moved or broken. These systems, however, merely sound an audible alarm. If the object to be secured is in a remote or sparsely populated location, or if the owner is out of hearing range, an audible siren may not deter or prevent a theft.

Therefore, there is a need for a cable lock system that can alert its user when it is tampered with.

SUMMARY OF THE INVENTION

In an exemplary embodiment, a cable lock system is provided, which comprises: a lock; a cable coupled to the lock and operative to conduct a current; a secondary wire coupled to said lock and operative to conduct a current; a current detector coupled to the cable and to the secondary wire, operative to detect an interruption of a current in at least one of the cable and the secondary wire; a battery operative to supply power to the current detector; an alarm coupled to the current detector and receiving power from the battery; and a heat sensor coupled to the cable and the secondary wire.

Further features and advantages of the invention, as well as the structure and operation of various embodiments of the invention, are described in detail below with reference to the accompanying drawings.

DETAILED DESCRIPTION OF THE INVENTION

An embodiment of the invention is discussed in detail below wherein like reference numbers generally indicate identical, functionally similar, and/or structurally similar elements. While specific exemplary embodiments are discussed, it should be understood that this is done for illustration purposes only. A person skilled in the relevant art will recognize that other components and configurations can be used without departing from the spirit and scope of the invention.

Figure 1:
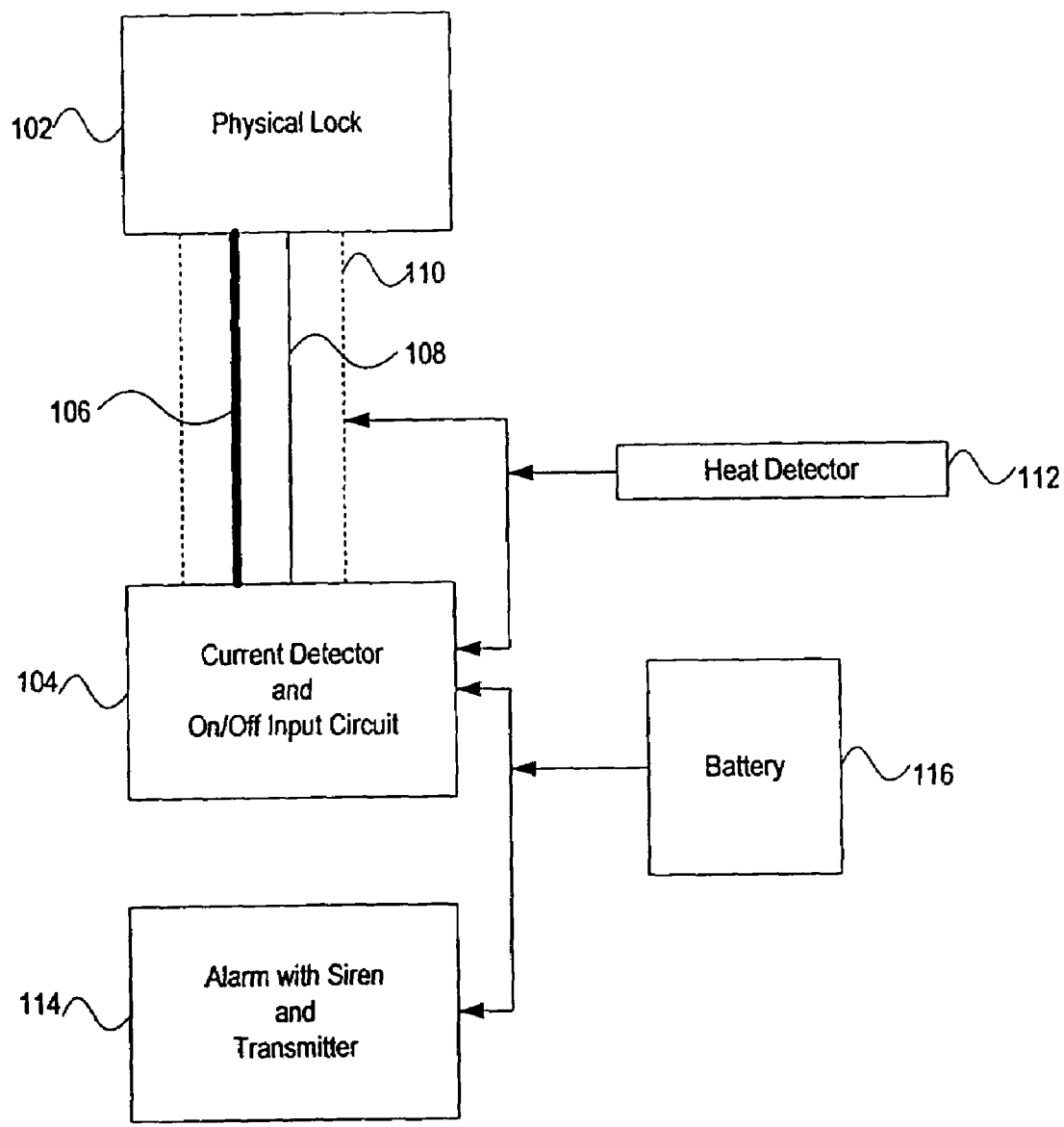
FIG. 1 illustrates a diagram of a cable lock system according to an exemplary embodiment of the invention.
Figure 2:
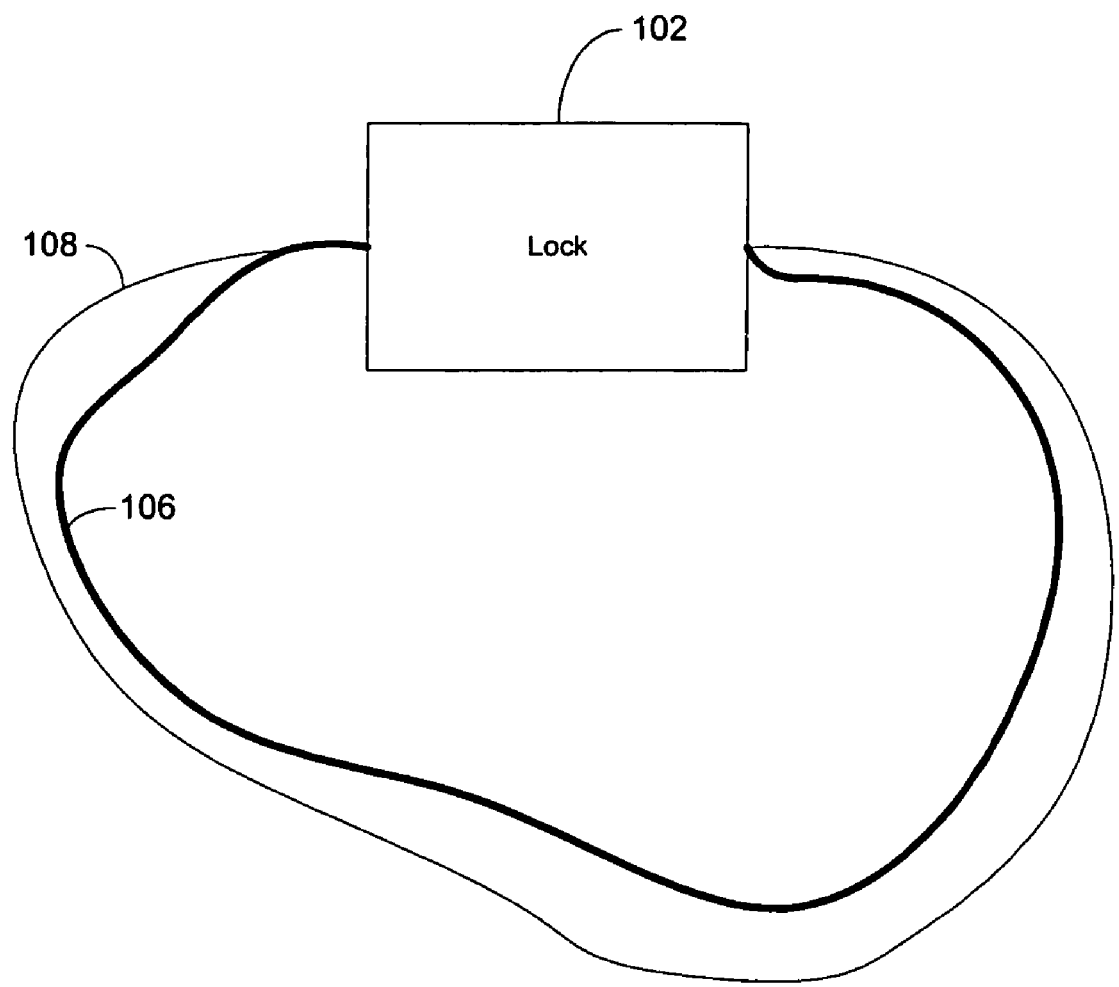
FIG. 2 illustrates a diagram of a cable lock system according to an exemplary embodiment of the invention.

FIG. 1 illustrates a diagram of an embodiment of the cable lock system of the present invention. A lock 102 is coupled to a cable 106. The lock can be, for example, a padlock, a combination lock, or any other conventional physical lock. The cable 106 can be, for example, steel, composite material, etc. The cable 106 may have two ends. The ends may my coupled to the lock 102 to form a loop (FIG. 2). The loop may be used as a lock to secure on item to another.

A current detector 104 may be coupled to cable 106 and to lock 102. The current detector 104 may also be arranged as a part of the lock 102. The current detector 104 provides a small current to the cable 106. A secondary wire 108 is also coupled to the lock 102 and to the current detector 104. The secondary wire 108 may be also formed in a loop. The cable 106 and the secondary wire 108 may be encased together in a coating 110, which can be, for example, a plastic or rubber coating. The cable 106 and the secondary wire 108 may be electrically coupled in parallel or in series.

The secondary wire 108 also carries a small current. A battery 116 powers the current detector 104. The battery 116 can be a standard user-replaceable battery or a rechargeable battery. A solar panel (not shown) may be provided to recharge to battery 116. The battery 116 also powers an alarm 114, which is also coupled to the current detector 104. The alarm 114 may include an audible siren and/or a transmitter. The transmitter may transmit an alarm remotely to the user via radio frequency (RF) or infrared (IR) signals. A heat-sensor 112, such as a thermistor, may be coupled to the cable 106, the secondary wire 108, the outer coating 110 or any one of these.

The alarm function of the cable lock system of the present invention can be triggered in several ways. When the lock 102 is engaged, a small current (i.e., a few micro-amps) runs in both the cables 106 and the secondary wire 108. For example, the cable 106 and secondary wire 108 may be electrically connected in series. Closing the lock 102 may complete a circuit between the cable 106, secondary wire 108 and current detector 104. Current the flows from the current detector 104 through cable 106, secondary wire 108, and back to the current detector 104. Alternatively, the cable 104 and secondary wire 108 may be arranged in parallel or in another configuration. If a would-be thief tries to cut through the casing 110, the current is interrupted in one or both of the cable 106 and the secondary wire 108. The current detector 104 detects this interruption and causes the alarm to go off.

In an exemplary embodiment, the secondary wire 108 acts to hold off a bias current that would otherwise cause the alarm to go off. When the secondary wire is cut, the bias current is then allowed to flow and causes the alarm to go off. In another embodiment, the current detector 104 detects an interruption in the series circuit including cable 106 and secondary wire 108 when one of these is cut and current does not return to the current detector 104. Similarly, if the battery itself is tampered with, or if the current is disrupted in another way, the current detector 104 causes the alarm to go off.

The alarm may also be triggered if the heat sensor 112 detects heat. For example, a would-be thief may attempt to cut through the casing 110, cable 106 or secondary wire 108 using a torch. The heat from the torch is detected and the alarm is activated. In an exemplary embodiment, multiple heat sensors can be placed along the cable 106 itself or inside the lock 102 or current detector 104.

As discussed above, the alarm may be any combination of an audible alarm, an IR transmitter to a remote location and an RF transmitter to a remote location. An IR or RF alarm signal may be transmitted by the alarm. The user carries a receiver (not shown), which receives the transmitted alarm signal and alerts the user. The alarm transmitter allows the cable alarm system to remain effective even if the owner is out of hearing range for an audible alarm. The audible alarm is still useful when the cable alarm system is used in a public place where passers-by would be attracted to the attempted theft by the alarm sound. In situations where no one will hear the audible alarm, the transmitter can alert the user to the attempted theft.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A cable alarm system comprising:
    a lock;
    a cable coupled to said lock and operative to conduct a current;
    a secondary wire coupled to said lock and to said cable and operative to conduct a current;
    a current detector coupled to said cable and said secondary wire, operative to detect an interruption of a current in at least one of said cable and said secondary wire;
    a battery operative to supply power to said current detector;
    an alarm coupled to said current detector and receiving power from said battery; and
    a heat sensor coupled to said cable and said secondary wire.

2. The cable alarm system of claim 1, wherein said alarm is at least one of an audible siren, an infra-red (IR) transmitter and a radio-frequency (RF) transmitter.

3. The cable alarm system of claim 2, further comprising at least one of an RF receiver and an IR receiver.

4. The cable alarm system of claim 1, further comprising a coating covering said cable and said secondary wire.

5. The cable alarm system of claim 1, wherein said cable is steel.

6. The cable alarm system of claim 1, wherein said secondary wire holds off a bias current from said alarm and wherein said alarm is triggered when said secondary wire is severed and said bias current flows to said alarm.

7. The cable alarm system of claim 1, wherein said alarm is triggered when said battery is removed or tampered with.

8. The cable alarm system of claim 1, wherein said alarm is triggered when said heat sensor detects heat.

9. A cable lock, comprising:
    a lock;
    a cable having a first end and a second end configured to be coupled to the lock to form a closed loop and adapted to conduct current;
    a secondary wire coupled to the lock and adapted to conduct current;
    a current detector coupled to the cable and the secondary wire and configured to detect an interruption in a current on at least one of the cable and the secondary wire;
    an alarm to transmit at least one of an infrared alarm signal or a radio frequency alarm signal coupled to the current detector; and
    a heat detector coupled to the alarm and to at least one of the cable and the lock.

10. The cable lock of claim 9, wherein the cable and the secondary wire are connected in series.

11. The cable lock of claim 9, wherein the cable and the secondary wire are connected in parallel.

12. A cable lock, comprising:
    a lock;
    a cable having a first end and a second end configured to be coupled to the lock to form a closed loop and adapted to conduct current;
    a secondary wire coupled to the lock and adapted to conduct current;
    a current detector coupled to the cable and the secondary wire and configured to detect an interruption in a current on at least one of the cable and the secondary wire;
    an alarm to transmit at least one of an infrared alarm signal or a radio frequency alarm signal coupled to the current detector, wherein the current detector is adapted to provide a signal to the alarm when the interruption in the current is detected, and a heat detector coupled to the alarm and to at least one of the cable and the lock.

13. The cable lock of claim 9, wherein the heat detector is adapted to provide a signal to the alarm when the interruption in heat is detected.

* * * * *